United States Patent [19]

Idel

[11] 4,072,068

[45] Feb. 7, 1978

[54] BAND SAW TEETH WORKING MACHINE

[76] Inventor: Vladimir Viktorovich Idel, ulitsa Kirova, 11, Zakarpatskaya oblast, Mukachevsky raion, selo Kolchino, U.S.S.R.

[21] Appl. No.: 767,784

[22] Filed: Feb. 11, 1977

[51] Int. Cl.² .............................................. B23D 63/04
[52] U.S. Cl. ............................................ 76/58; 76/77
[58] Field of Search ..................... 76/58, 61, 77, 78 R, 76/35, 34

[56] References Cited

FOREIGN PATENT DOCUMENTS 2,508,616   9/1975   Germany .................................. 76/58

Primary Examiner—Harold D. Whitehead
Assistant Examiner—Roscoe V. Parker
Attorney, Agent, or Firm—Robert E. Burns; Emmanuel J. Lobato; Bruce L. Adams

[57] ABSTRACT

A band saw teeth working machine comprises a framework having mounted thereon: a device for clamping a band saw by the side surfaces thereof, having abutments for the apices of the teeth of the band saw and for the back edge thereof, a mechanism for advancing the band saw stepwise in accordance with its pitch and a tool for working the teeth of the saw. The machine includes an auxiliary device for clamping the band saw by the side surfaces thereof, mounted on the stepwise-advancing mechanism, arranged in front of the band saw clamping device in the direction of the advance of the band saw being worked upon, adjacent to this last-mentioned device. The provision of this auxiliary device enables to operate the same machine for setting and notching the teeth of the band saw.

4 Claims, 5 Drawing Figures

BAND SAW TEETH WORKING MACHINE

The present invention relates to improvements in or relating to machines for working the teeth of band saws.

There have been already disclosed machines for setting the teeth of band saws, including a framework having mounted thereon a device for clamping a band saw by the side surfaces thereof, i.e., by its blade. The device has mounted thereon abutment means for the apices of the teeth of the saw and abutment means for the back edge of the saw, facing each other. The device includes a housing and a cover, accommodating guideways therebetween, for the band saw to be advanced between these guideways, while the teeth thereof are being worked upon.

The framework of the machine further has mounted thereon tool means for setting the teeth of a band saw, arranged adjacent to the said abutments, in front thereof in the direction of the advance of the band saw in the process of working the teeth of the latter. The tool means or tools are carried by ends of arms pivoted about a common axis extending parallel with the saw advancing direction.

The other ends of the arms support followers permanently engaging a cam secured on a shaft operatively connected with the drive of the machine, for bringing the tools alternatingly into engagement with the teeth of the band saw, to set these teeth. The follower-supporting ends of the arms are interconnected with a spring.

The framework has also mounted thereon a mechanism for advancing the band saw in a stepwise fashion, in accordance with the pitch of the teeth of the saw, including a member (a pawl) adapted to engage the teeth of the band saw. This member is mounted on a component (a slide) operatively connected with a drive adapted to reciprocate this component in a direction parallel with the saw-advancing direction.

The machines of the prior art are capable of solely setting the teeth of a band saw. To perform notching or cutting of the teeth of a band saw, other tooth-cutting machines have to be installed, thus increasing the floor space requirements, which in most cases in undesirable.

It is an object of the present invention to create a band saw teeth working machine having a structure which, while being relatively simple, should enable to operate the machine both for setting and notching the teeth of a band saw.

It is another object of the present invention to create a machine of the type specified, which should preclude friction between the apices of the teeth and the abutments in the course of the advance of the band saw.

These and other objects are attained in a machine for working the teeth of a band saw, including a framework having mounted thereon a device for clamping the band saw by the side surfaces thereof, having abutments for the apices of the teeth of the band saw and for the back edge of the latter, a mechanism for advancing the band saw stepwise in accordance with the pitch of the teeth thereof, the component of which, carrying a member adapted to cooperate with the teeth of the saw, is mounted for reciprocation in a direction parallel with that of the advance of the band saw, and a tool for working the teeth of the saw, operatively connected with a drive and arranged after the stepwise-advancing mechanism in the direction of the advance of the band saw, which machine, in accordance with the present invention, additionally includes an auxiliary device for clamping the band saw by the side surfaces thereof, having an abutment adapted to be engaged by the apices of the teeth of the saw, mounted on the said component of the stepwise-advancing mechanism, so that this auxiliary clamping device is in front of the aforementioned clamping device mounted on the framework of the machine, in the direction of the advance of the band saw, adjacent to this aforementioned clamping device.

It is expedient that the auxiliary band saw-clamping device should comprise a housing mounted on said component of the stepwise-advancing mechanism and a cover pivotally attached to said housing, so that the band saw can be placed between the respective surfaces of the housing and of the cover, facing each other.

This structure of the auxiliary device is simple and reliable in operation.

It is quite expedient to have a current conducting member, connectable to a source of electric current, mounted on the surface of the housing, adjoining the band saw.

With such a current-conducting member incorporated, the machine becomes capable of either butt-welding of band saw blades, or else of soldering them together with an overlap.

It may be also expedient that the stepwise-advancing mechanism should include an attachment for selectively retaining the member adapted to cooperate with the teeth of a saw in the inoperative position of this member.

A band saw teeth working machine constructed in accordance with the present invention, although relatively simply structurally improved, enables to save significant amounts of production floor space, capable as it is of both notching the teeth of a band saw and of setting these teeth, which is attainable by merely mounting the appropriate tool for working the teeth of a band saw.

Furthermore, the machine enables to either butt-weld the blades of band saws, or else to solder them together with an overlap.

Given hereinbelow is a description of an embodiment of the present invention, with reference being had to the accompanying drawings, wherein:

FIG. 5 is a view along arrow "B" in FIG. 1 at the auxiliary band saw-clamping device.

Figure 1:
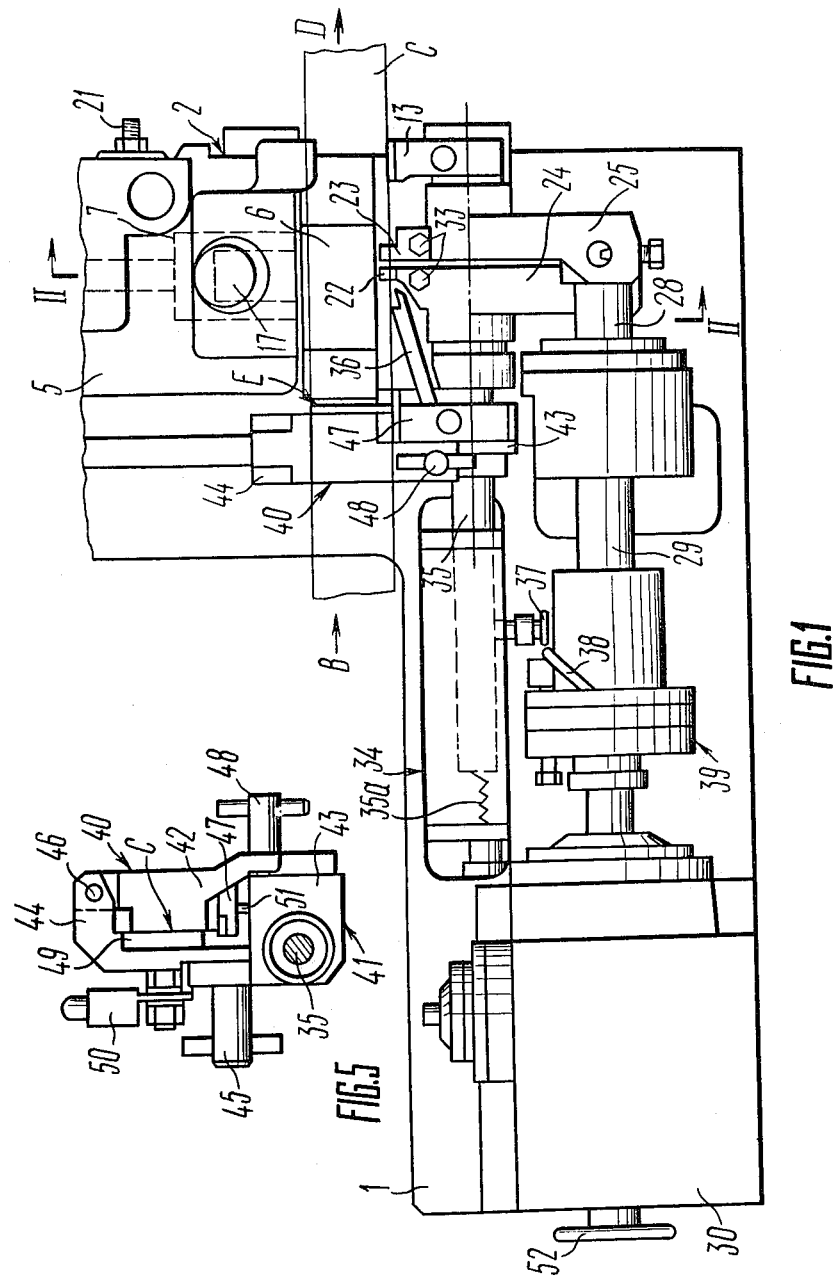
FIG. 1 is a general plan view of a machine for working the teeth of a band saw, embodying the invention.

Referring not in particular to the appended drawings, a machine for working the teeth of a band saw "C" (FIG. 1) comprises a framework 1 having mounted thereon a device 2 for clamping the band saw "C" by the side surface of the latter, i.e., by the blade of the saw. This device is intended to retain the band saw in a limited "floating" position, while the teeth of the saw are being worked upon. The clamping device 2 has a base 3 (FIG. 2) secured to the framework 1. The base 3 has mounted thereon a plate 4 with guides (not shown) for the movement of a cover 5, and also a strip 6 serving as a guideway for the band saw "C." The plate 4 also accommodates thereon an abutment 7 against which the band saw "C" abuts by its back edge.

The base 3 has further mounted thereon a bracket 8 adapted to support a shaft 9 having an inclined slot "a" extending longitudinally of this shaft. The end of the shaft 9, facing the abutment 7, has a reduced-diameter portion ending with a spherical tip.

This portion of the shaft 9 has its spherical tip received in a recess made in the abutment 7, with a rubber block 10 received between the spherical tip of the shaft 9 and the abutment 10, this rubber block being incorporated to compensate for manufacturing tolerances of the width of the band saw. The recess of the abutment 7, receiving therein the spherical tip of the shaft 9, is partly closed from the outside with a strip 11. A gap "b" is left between the shoulder 12 of the greater-diameter part of the shaft 9 and the strip 11, the actual value of this gap being 1 . . . 2 mm. Adjustably mounted on the base 3 is an abutment 13 (FIGS. 1 and 3) providing a reference surface for the apices of the teeth of the band saw "C." A compression spring 14 (FIG. 2) is received between the strip 11 and the bracket 8, to urge the band saw "C" against the abutment 13 (FIGS. 1 and 3), when the band saw "C" is being placed into the clamping device 2.

The cover 5 has mounted thereon: a retaining element 15 (FIG. 2) having its tip received in the slot "a" of the shaft 5, to retain the cover 5 in a required predetermined position; a retaining element 16 retaining the cover 5 with respect of the plate 4; and a retaining element 17 in the form of a screw with a nut 18, urging through a rubber block 19 and a member 20 the band saw "C" against the strip 6. The cover 5 further supports thereon a screw 21 (FIG. 1) intended for final clamping of the band saw "C" in the device 2.

Figure 2:
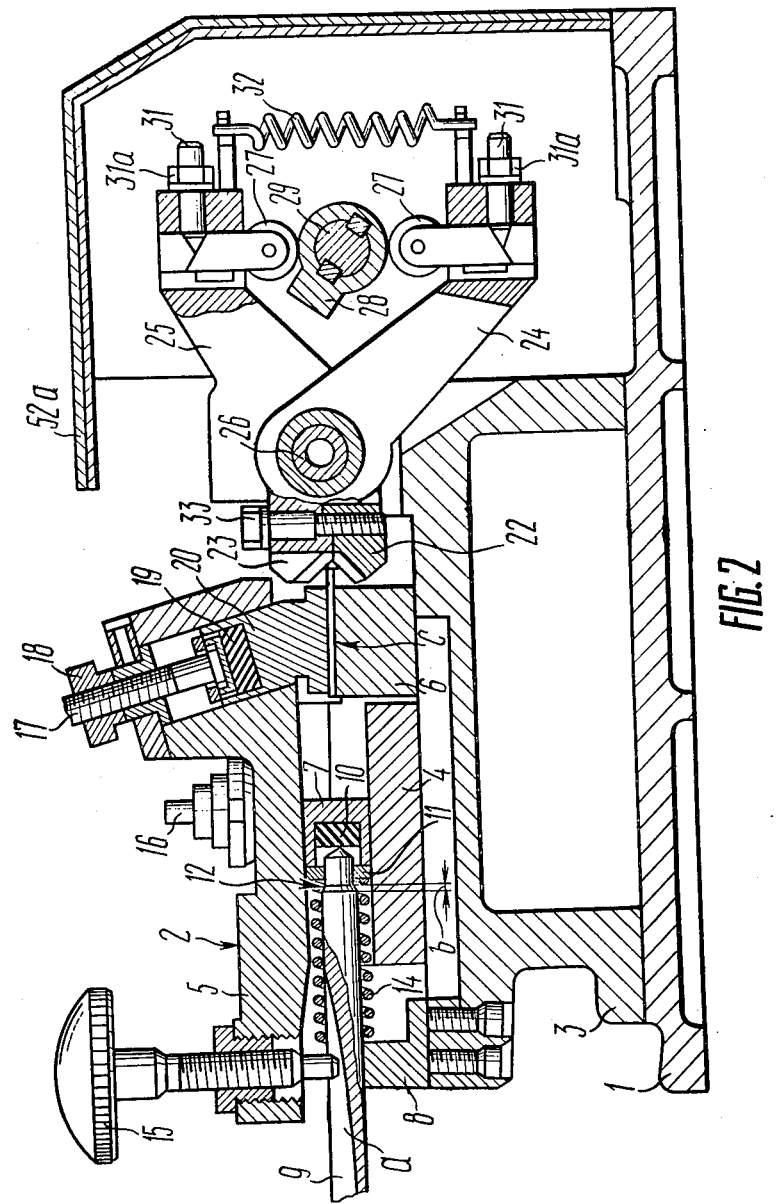
FIG. 2 is a sectional view taken on line II—II of FIG. 1.
Figure 4:
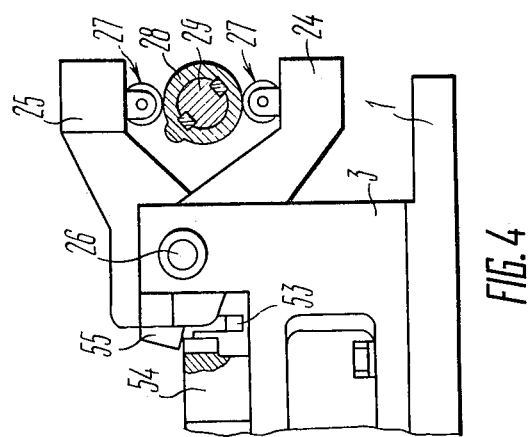
FIG. 4 is a view along arrow "A" in FIG. 3, turned through 90°.
Figure 3:
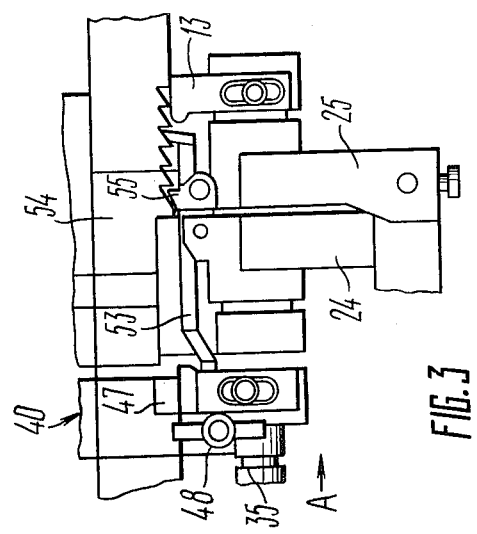
FIG. 3 illustrates the position of the pawl of the band saw-advancing mechanism in operation of notching the teeth of a band saw.

Arranged in front or upstream of the abutment 13 in the direction of the advance of the band saw "C," indicated with arrow "D", are tools 22 and 23 for working the teeth of the band saw "C". The tools 22 and 23 are mounted on the ends of respective arms 24 and 25 pivoted about a single axle or pin 26 (FIG. 2). The axle 26 extends in a direction parallel with that of the advance of the band saw "C." The opposite ends of the arms 24 and 25 carry respective followers 27 (FIGS. 2 and 4) engaging a cam 28 secured on a shaft 29 operatively connected through a reducer 30 (FIG. 1) with a motor (not shown). The cam 28 (FIG. 2) is thus rotatable to bring the tools 22 and 23 alternatingly into engagement with the band saw.

To adjust the positions of the followers 27 with respect of the cam 28, each follower 27 is associated with an adjustment screw 31 with a nut 31a. The follower-carrying extremities of the arms 24 and 25 are urged together by an extension spring 32, maintaining the followers 27 in engagement with the cam 28.

The tools 22 and 23 are detachably mounted on the respective arms 24 and 25 with aid of bolts 33, which enables to to replace the tools mounted in the machine with other ones.

To effect stepwise advance of the band saw "C" in accordance with the pitch thereof, a mechanism 34 (FIG. 1) is incorporated, including a component hereinafter referred to as a slide 35 carrying a member hereinafter referred to as a pawl 36 adapted to cooperate with the teeth of the band saw "C." The slide 35 is urged at one end thereof with an extension spring 35a and extends parallel with the direction "D" of the advance of the band saw "C." The slide 35 carries a follower 37 engageable with a cam member 38 of the actuator 39 mounted on the shaft 29. The actuator 39 converts rotation of the shaft 29 into reciprocation of the slide 35.

The slide 35 supports thereon an auxiliary device 40 for clamping the band saw "C" by the side surfaces thereof, i.e. by its blade. This auxiliary device 40 is arranged in front of the main clamping device 2 in the direction "D" of the advance of the band saw "C," adjacent to this main device 2. The auxiliary clamping device 40 includes a housing 41 (FIG. 5) secured to the slide 35 and a cover 42. The housing 41 is made up of two parts 43 and 44 rigidly interconnected with a screw-nut couple 45. The cover 42 is connected with the housing 41 by means of a pivot pin 46 providing for pivoting of the cover 42 relative to the housing 41, when a band saw is to be placed into the device 40. The housing 41 has mounted thereon an adjustable abutment 47 for the apices of the band saw "C."

The abutment 47 is arranged so that the surface thereof, adapted to contact the teeth of the band saw "C," belongs to the same plane with the surface of the abutment 13, likewise adapted to contact the teeth of the band saw "C."

In the closed position, i.e., in the position corresponding to the operation of working the teeth of a band saw, the cover 42 and the housing 41 are held together by a screw-nut couple 48. The band saw "C" is receivable between the respective surfaces of the cover 42 and of the housing 41, facing each other.

With the auxiliary clamping arrangement 40 mounted on the slide 35 of the stepwise-advancing mechanism 34, the machine becomes capable of notching or cutting the leading teeth of a saw band, since the latter can be advanced stepwise, while being clamped in this auxiliary device 40 moving jointly with the side 35.

For the machine to be operable for butt-welding of the blades of band saws, a current-conducting member 49 made of copper, brass or any other suitable material is mounted in the housing 41 of the auxiliary device 40, on the surface thereof, adjoining the band saw "C." This current-conducting member 49 in this case is connectable through a terminal 50 to a source of electric current (not shown). To preclude interaction of the pawl 36 with the teeth of the band saw "C" in the course of a welding operation, the abutment 47, a special means is provided on the abutment 47, which in the presently described embodiment is a screw 51.

A handwheel 52 operatively connected with the shaft (not shown) of the reducer 30 is provided for manual actuation of the machine, for adjustment and other purposes.

The working parts of the machine are enclosed within a casing 52a.

The herein disclosed machine for working the teeth of a band saw operates, as follows.

Irrespectively of what operation is to be performed by the machine, i.e., setting of band saw teeth, their notching or welding, the following adjustments are carried through. The abutment 13 and the abutment 47 are set for their respective surfaces adapted to contact the teeth of the band saw "C" to belong to the same plane. Both abutments are meant to provide the reference surface for the apices of the teeth of the band saw "C." The actuator 38 is adjusted for the required stepwise advance or feed of the band saw "C." Then the member 20 is raised by a height slightly in excess of the thickness of the blade of the band saw "C," by turning out the retaining member 17; the retaining member 16 is raised, the screw 21 is turned out toward the operator, and the cover 5 is moved into its rearmost position shown in FIG. 1. The band saw "C" is placed upon the strip 6, with the abutment 7 pulled backward. Then the action of the spring 14 upon the abutment 7, now released, urges the band saw "C" into engagment of the apices of its teeth with the respective surfaces of the abutments 13 and 47. Then the cover 5 is moved upon the band saw "C," the retaining member 16 automatically retaining the cover 5 in this moved-on position. Then the position of the abutment 7 is fixed by retaining the shaft 9 with the retaining member 15 entering the slot "a." The cover 5 is then secured with the screw 21. This done, the band saw "C" is additionally fixed with the retaining member 17 through the clamping member 20 to provide, depending on the operation to be performed by the machine, either for sliding of the band saw during a teeth-setting operation or a teeth-notching one, or else for tensioning of the band saw for welding.

With the teeth sharpened, their setting is effected, as follows.

Tools 22 and 23 — bending dies — are secured on the respective arms 24 and 25 to set the teeth of the band saw "C." With the band saw "C" being advanced stepwise, the abutment 47 moves jointly with the band saw. While the abutment 47 is being driven toward its rearmost position (i.e. to the left in FIG. 1), the teeth of the band saw "C" are set, by the followers 27 alternatingly engaging the driving field of the cam 28 and thus alternatingly bringing the tools 22 and 23 — the bending dies — into engagement with the teeth of the band saw "C." At this moment the band saw "C" somewhat clears the abutments 13 and 47 under the action of the bending dies; therefore, with the abutment 47 being driven toward its endmost position (the extreme left-hand one in the drawing, FIG. 1), the teeth-contacting surface thereof does not contact the apices of the teeth of the band saw "C," whereby blunting of the sharpened teeth of the band saw by the contact surface of the abutment 47 is precluded. With the teeth set, the overall width of the band saw is somewhat reduced, which enhances prevention of blunting of the apices of the teeth of the band saw by the contact surface of the abutment 13.

Notching of the teeth of a band saw is effected, as follows. The pawl 36 mounted for setting the teeth of the band saw is removed and replaced with a pawl 53 (FIGS. 3 and 4) of a length considerably in excess of that of the pawl 36. The strip 6 is replaced with a die 54 (FIG. 4), and a notching tool — a cutting die 55 — is mounted on the arm 25. The band saw "C" is placed into the clamping device 2, and the actuator 39 is adjusted for the required feeding pitch. Then the reducer 30 is engaged, and the respective follower 27 is actuated by the cam 28 to pivot the arm 25 about the axle 26, for the cutting die 55 to act upon the band saw "C" to cut or notch the first tooth. Then the reducer 30 is disengaged.

Now the auxiliary clamping device 40 is moved, jointly with the slide 35, into the extreme left-hand position (in the drawing, FIG. 1), and the band saw is secured therein. The handwheel 52 is operated to move the auxiliary clamping device 40 with the band saw "C" therein through the required step, whereafter the effort of clamping the band saw "C" in the auxiliary device 40 is substantially relieved, and the reducer 30 is engaged to drive the tool, i.e. the cutting die 55, to notch the second tooth of the band saw "C." In a similar manner either one or two more teeth of the band saw are notched, whereafter the auxiliary clamping device 40 is opened and takes no part in the successive operation of notching the teeth of the band saw "C."

Notching of the successive teeth of the band saw "C" is effected by advancing the band saw "C" stepwise with the pawl 53, until the notching operation is completed. In practice, the notching of the first two . . . four teeth of the band saw "C," with the latter being clamped for its stepwise feed in the auxiliary device 40, is performed at a slow running speed of the machine, e.g. 35 teeth per minute, whereas the successive automatic notching sequence can be performed at a higher speed, e.g. 250 . . . 300 teeth per minute.

When the herein disclosed machine, embodying the invention, is used for welding together the blades of band saws, the end portion of one blade is clamped in the auxiliary clamping device 40, with the teeth positioned and indexed by their engagement with the reference contact surface of the abutment 47, and the end face of this blade is positioned strictly parallel with the end face of the other blade clamped in the device 2. The apices of the teeth of the other band saw are likewise positioned and indexed by their contact with the reference contact surface 47 of the abutment 47, this surface 47 spanning the welding zone "E."

With the ends of the saw band blades clamped, respectively, in the devices 2 and 40, the pawl 36 is disengaged from the teeth of the band saw with aid of the screw 51. Then the auxiliary clamping device 40 jointly with the band saw "C" is moved into its extreme left-hand (in the drawing) position, and the welding transformer (not shown) acting as the source of the welding current is switched on. The stepwise-advancing mechanism 34 is engaged, and the auxiliary clamping device 40 jointly with the band saw "C" is advanced until the end face of the blade of this band saw "C" contacts the end face of the other band saw "C" clamped in the device 2. Electric butt-welding takes place.

With the ends of the two band saws "C" butt-welded, the nut 48 is operated to somewhat relieve the effort of clamping the respective band saw in the auxiliary clamping device 40. The slide 35 is moved jointly with the auxiliary clamping device 40 into the endmost left-hand (in the drawing) position. Then the effort of clamping the band saw in the device 2 is likewise relieved. The weld-jointed saw is positioned with its welded seam at the centre of the space thus offered, and then is re-tightened in the two clamping devices 2 and 40. Now the welding transformer is switched over to an operating duty corresponding to post-annealing of the welded seam. With the post-anealing operation completed, the band saw is released and removed from the clamping devices 2 and 40.

It can be seen from the above description that the incorporation of the auxiliary clamping device and abutment is accordance with the present invention has enabled, wherever necessary, to operate the machine for electric butt-welding, for post-annealing of the welded seam, for notching the first two or four teeth of a band saw prior to automatic notching of other teeth of the entire blade of the band saw, as well as for setting the teeth of a band saw, following the sharpening operation, without blunting the apices of the teeth in the course of the stepwise advance of the band saw. In practice, readjustment of the machine from one mode of operation to another one takes but 10 to 20 minutes.

What is claimed is:

1. A machine for working the teeth of a band saw, comprising: a framework; a device for clamping a band saw by the side surfaces thereof, mounted on said framework; abtument means for the apices of the teeth of the band saw and for the back edge thereof, mounted on said device for clamping the band saw by the side surfaces thereof; a mechanism for advancing the band saw stepwise, mounted on said framework; a component of said stepwise-advancing mechanism, carrying a member adapted to cooperate with the teeth of the band saw being advanced, said component being mounted for reciprocation in a direction parallel with the direction of the advance of the band saw in the course of working the teeth of the band saw; tool means for working the teeth of the band saw, mounted on said framework and arranged after said stepwise-advancing mechanism in the direction of the advance of the band saw; an auxiliary device for clamping the band saw by the side surfaces thereof, mounted on said component of said stepwise-advancing mechanism so that said auxiliary clamping device is arranged in front of said aforementioned clamping device mounted on said framework in the direction of the advance of the band saw, adjacent to said aforementioned clamping device; abutment means for the apices of the teeth of the band saw, mounted on said auxiliary device for clamping the band saw by the side surfaces thereof; driving means for actuating said stepwise-advancing mechanism and said tool means for working the teeth of the band saw.

2. A machine as set forth in claim 1, wherein said auxiliary device for clamping the band saw by the side surfaces thereof includes a housing mounted on said component of said stepwise-advancing mechanism and a cover connected with this housing for pivoting relative thereto, to provide for placing a band saw between the respective surfaces of this housing and of this cover, facing each other.

3. A machine as set forth in claim 1, wherein said stepwise-advancing mechanism supports means for retaining the member adapted to cooperate with the teeth of the band saw in the inoperative position of this member.

4. A machine as set forth in claim 2, wherein the housing has mounted therein, on the surface thereof adjoining the band saw, a current-conducting member connectable to a source of electric current.

* * * * *